United States Patent Office 3,425,326
Patented Feb. 4, 1969

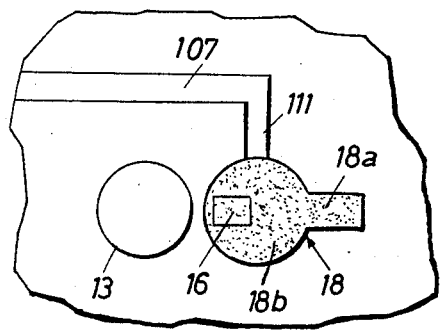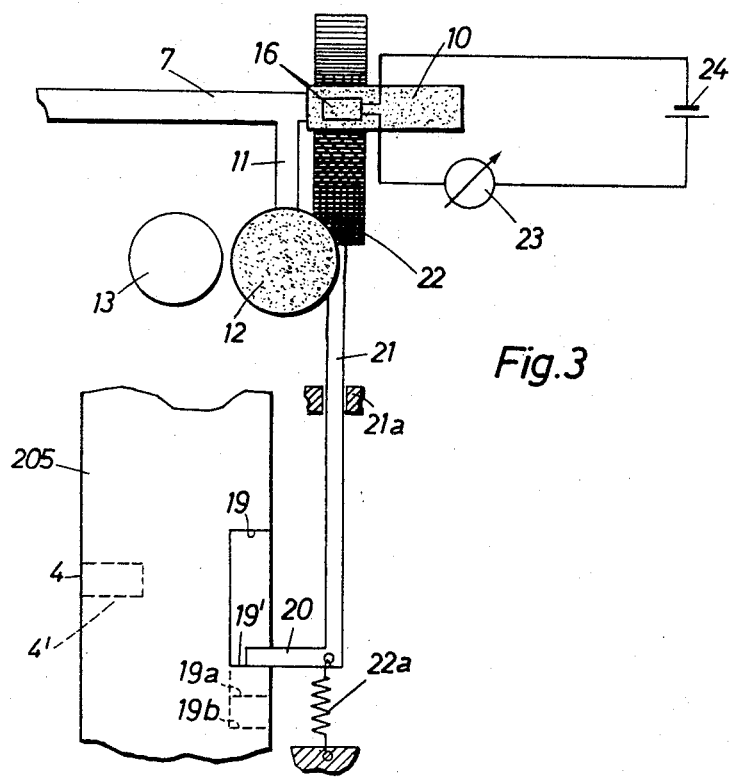

3,425,326
CAMERA WITH EXPOSURE METER
Erwin von Wasielewski, Munich, Germany, assignor to
Agfa-Gevaert Aktiengesellschaft, Munich, Germany
Filed Oct. 22, 1965, Ser. No. 500,864
Claims priority, application Germany, Nov. 13, 1964,
A 47,603
U.S. Cl. 95—10     17 Claims
Int. Cl. G01j 1/00

ABSTRACT OF THE DISCLOSURE

A photographic camera which is used with different types of films furnished in containers having markers indicating the film type therein. A detector is movable from a first to a second position in response to engagement with markers of containers respectively containing outdoor and indoor film whereby the detector moves a filter across the light path on engagement with the marker which indicates indoor film. A lighting unit can be attached to the camera to thereby move the detector to a third position in which the detector adjusts the exposure meter.

---

The present invention relates to cameras in general, and more particularly to still cameras or motion picture cameras which are provided with adjustable exposure meters. Still more particularly, the invention relates to cameras which may utilize specially constructed containers provided with markers positioned and configurated in such a way as to indicate the type of film which is being stored in the respective container. For example, such markers may indicate that the containers accommodate black-and-white film, daylight color film of the same sensitivity, or artificial-light color film of higher sensitivity.

It is an important object of the invention to provide a motion picture camera or still camera which is constructed and assembled in such a way that films of a given type and intended to be used primarily in a first type of light can be used with equal advantage in another type of light, or vice versa.

Another object of the invention is to provide a camera of the just outlined characteristics wherein the attachment or disconnection of a lighting unit automatically results in necessary adjustments of the exposure meter so that the exposure meter is calibrated for measuring artificial light as soon as the lighting unit is properly connected with the camera housing.

A further object of the invention is to provide a camera of the above outlined type wherein the exposure meter is automatically adjusted for different film speeds as soon as a container accommodating a predetermined type of film having a given speed is properly inserted into the housing.

An additional object of the invention is to provide a camera wherein the insertion of a container for a given type of film automatically results in a plurality of adjustments which insure that the camera is ready to take satisfactory pictures with the selected film type.

A concomitant object of the instant invention is to provide a novel container for films which may be utilized in a camera of the above outlined characteristics.

Still another object of the invention is to provide a novel detector structure which may be utilized to adjust the camera in response to proper insertion of a film cartridge or magazine into the camera housing.

A further object of the invention is to provide a novel operative connection between the detector structure and the exposure meter of a still camera or motion picture camera.

Another object of the invention is to provide a highly versatile motion picture camera or still camera which is constructed and assembled in such a way that an inexperienced or absentminded photographer is practically compelled to take satisfactory pictures because all such adjustments which are necessary to account for the type and speed of film are carried out in a fully automatic way as soon as a film container is properly inserted into the housing.

A further object of the invention is to provide a novel compensating structure which cooperates with the aforementioned detector structure and automatically adjusts the exposure meter for use with films of the same type but having different speeds.

An additional object of the invention is to provide a motion picture camera or still camera which can be automatically converted from taking pictures in daylight to taking pictures in artificial light or vice versa, which can be automatically converted from taking pictures in daylight with a daylight film to taking pictures in artificial light with the same daylight film, and which can be also converted from taking pictures in artificial light with artificial light film to taking pictures in daylight with the same type of film, or vice versa.

A more specific object of the invention is to provide a camera which may utilize two types of film each of which has a given sensitivity.

A further object of the invention is to provide a very simple and compact camera of the above outlined characteristics wherein all adjustments which are necessary to convert the camera for use with two different film types may be carried out by resorting to a very simple and rugged mechanism comprising a minimal number of component parts.

An ancillary object of the above defined character is to provide a camera of the above defined character wherein the exposure meter is adjusted in automatic response to proper insertion of a film cartridge or magazine and wherein such insertion can bring about more than a single adjustment of the exposure meter.

Briefly stated, one feature of my present invention resides in the provision of a motion picture camera or still camera for use with different types of film (e.g. with daylight color film and artificial-light color film) which are furnished in containers provided with suitable markers indicative of the film type therein. The camera comprises a housing, a detector mounted in the housing and arranged to assume first and second positions in response to engagement with the markers of containers which respectively contain first and second film types, means for guiding incoming light rays along a predetermined path in a direction toward the unexposed film frame, filter means operatively connected with the detector to extend into and to be removed from such predetermined path when the detector respectively assumes its second and first positions, a lighting unit having a portion movable with reference to the housing to and from an operative position in which the detector is caused to assume a third position and to remove the filter means from the path of light rays, adjustable exposure meter means, and adjusting means operatively connected with the detector for adjusting the exposure meter means in the operative position of the lighting unit.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawings, in which:

FIG. 2 is a fragmentary diagrammatic view of a slightly modified camera;

FIG. 3 illustrates a further modification of the structure shown in FIG. 1 wherein the exposure meter may be adjusted in response to attachment of a lighting unit and also in response to insertion of containers which accommodate films of the same type but having different speeds;

Figure 1:
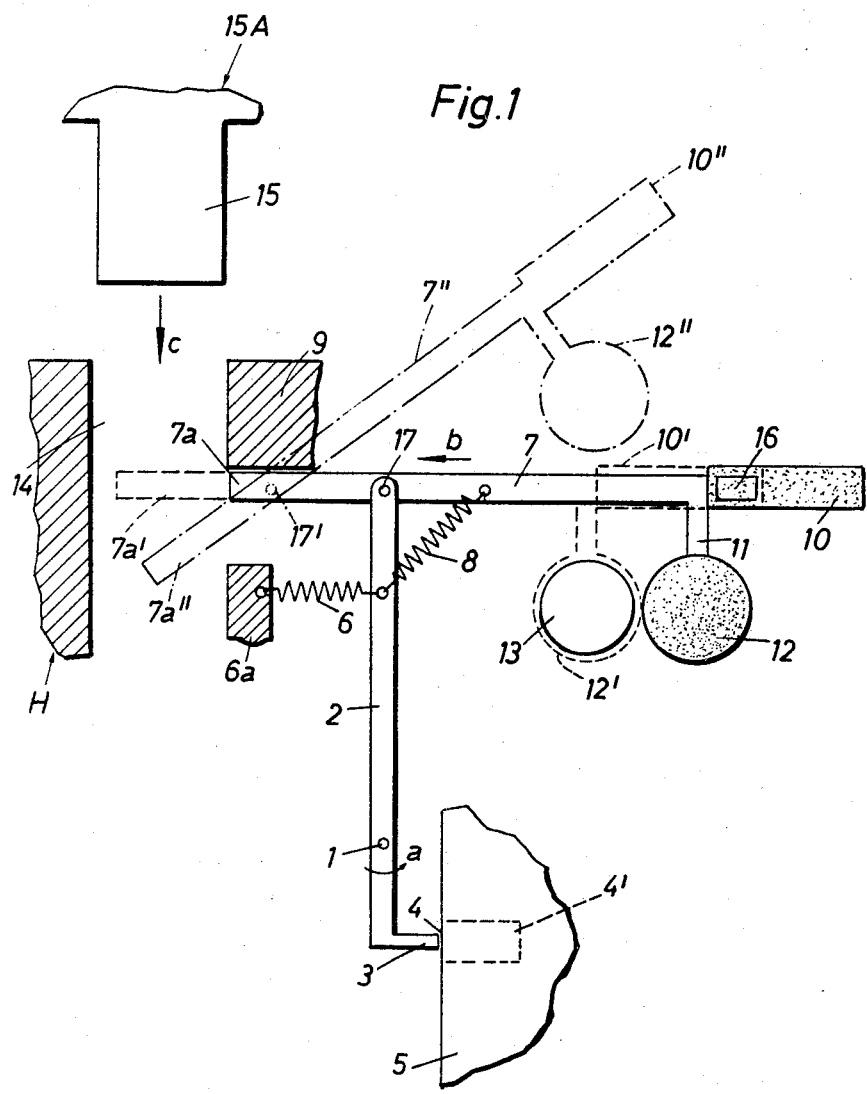
FIG. 1 is a diagrammatic partly sectional view of a portion of a camera which embodies one form of my invention and wherein the detector comprises two interconnected levers.

Referring first to FIG. 1, there is shown a portion of a motion picture camera or still camera which comprises a housing H. This housing carries a pivot 1 for a detector here shown as comprising two interconnected levers 2 and 7. The lever 2 is rockable about the axis of the pivot 1 and its free lower end carries a projection 3 which constitutes a sensing element and serves to track markers provided on containers 5 which represent cartridges or magazines for different types of film. The container 5 comprises a marker 4 which is constituted by a flat and smooth portion of its external surface and abuts against the sensing element 3 to maintain the lever 2 in the solid-line position of FIG. 1 as soon as the container 5 is properly inserted into the housing H. The marker 4' of a second container which accommodates a different type of film is indicated in FIG. 1 by broken lines; this marker 4' is assumed to be constituted by a recess or notch in the external surface of the corresponding container and can accommodate at least a portion of the sensing element 3 when the respective container is properly inserted into the housing H whereby a spring 6 compels the lever 2 to assume a second position by turning about the axis of the pivot 1 in the direction indicated by an arrow a. The spring 6 operates between the longer upper arm of the lever 2 and a stationary portion 6a of the housing H and tends to rotate the lever 2 in a counterclockwise direction as the parts appear in FIG. 1. It is to be noted that the marker 4' does not form part of the container 5, the latter's marker being constituted by the aforementioned flat and smooth surface portion 4. In the position shown in FIG. 1, the container 5 is assumed to be properly positioned in the housing H. The function of the spring 6 is to permanently bias the lever 2 to the aforementioned second position in which the sensing element 3 extends into the marker 4' to such an extent that a portion of the lever 2 actually abuts against the corresponding container.

The upper end portion of the lever 2 is articulately coupled with the second lever 7 by means of a pin 17 in such a way that, when the lever 2 is free to follow the bias of the spring 6 and turns in the direction indicated by the arrow a, the lever 7 is shifted in the direction indicated by an arrow b. During such shifting, the left-hand arm of the lever 7 is caused to slide along a guide member 9 which, too, may form part of the housing H. A spring 8 which operates between the upper arm of the lever 2 and the right-hand arm of the lever 7 tends to rock the lever 7 in a clockwise direction and to maintain this lever 7 in abutment with the guide member 9.

The free end of the right-hand arm of the lever 7 carries a grey filter 10 which is normally located in the path of light rays impinging against a photosensitive element 16 forming part of an adjustable exposure meter for the camera. The photosensitive element 16 may constitute a resistor or a photoelectric cell. The dimensioning of the grey filter 10 is such that it remains in the path of light rays passing to the photosensitive element 16 when the lever 2 assumes the solid-line position of FIG. 1 or the second position in which the sensing element 3 extends into the marker 4'. That position of the grey filter 10 which corresponds to the second position of the lever 2 is indicated by broken lines, as at 10'. This filter 10 actually constitutes an adjusting or calibrating device for that exposure meter which includes the photosensitive element 16 because, under certain circumstances, the filter 10 may be removed from the path of light rays which travel to the element 16.

The right-hand arm of the lever 7 further carries an extension or branch 11 which supports a corrective filter 12. This filter 12 assumes the solid-line position of FIG. 1 when the sensing element 3 tracks the marker 4. However, when the sensing element 3 extends into the marker 4', the lever 2 causes the lever 7 to move in a direction to the left and to place the filter 12 in front of an aperture 13 which serves to guide and direct incoming light rays along a predetermined path and against the unexposed frame of the film in that container which is provided with the marker 4'. The filter 12 then assumes the broken-line position 12', and such position 12' corresponds to the broken-line position 10' of the grey filter 10.

The left-hand end portion 7a of the lever 7 constitutes a motion transmitting member or trip which may extend into a socket or passage 14a defined by the housing H and arranged to receive a plug-shaped portion 15 of a lighting unit 15A. When the sensing element 3 extends into the marker 4', the motion-transmitting trip 7a assumes the broken-line position 7a' and extends into the path of the plug 15 so that, if the operator decides to advance the plug in the direction indicated by an arrow c in order to move the lighting unit 15A to the operative position in which the plug is received in the socket 14 and the lighting unit is properly attached to the housing H, the plug will tilt the lever 7 about the axis of the pin 17 so that the lever 7 assumes the phantom-line position 7" and moves the filters 10, 12 to the phantom-line positions 10", 12". In such positions, the filters 10, 12 are respectively removed from the paths of light rays which travel to the photosensitive element 16 and through the aperture 13. In other words, the trip 7a extends into the socket 14 only when the sensing element 3 extends into the marker 4', i.e., when the pin 17 assumes the position 17'. The pin 17 remains in the position 17' when the plug 15 is caused to tilt the lever 7.

If the operator decides to insert into the housing H a container 5 which accommodates a supply of black-and-white film having a given sensitivity or a supply of daylight color film having the same sensitivity, the lever 2 assumes the solid-line position of FIG. 1 and cooperates with the spring 8 to maintain the lever 7 in abutment with the guide member 9 so that the grey filter 10 overlies the photosensitive element 16 but the corrective filter 12 remains removed from the path of light rays which pass through the aperture 13. In such position of the lever 2, insertion or removal of the plug 15 from the socket 14 cannot influence the angular position of the lever 7 because the trip 7a does not extend beyond the left-hand side of the guide member 9.

If the container 5 is replaced with a container accommodating a supply of artificial-light color film having a sensitivity which is different from that of the aforementioned daylight or black-and-white films, the sensing element 3 enters the marker 4' under the bias of the spring 6 and the lever 7 is shifted in the direction indicated by the arrow b to place the trip 7a into the broken-line position 7a' and to respectively move the filters 10, 12 to the broken-line positions 10', 12'. During such shifting, the spring 8 maintains the left-hand arm of the lever 7 in abutment with the guide member 9. The corrective filter 12 is now located in the path of light rays which travel through the aperture 13, and the grey filter 10 still remains in the path of light rays travelling to the photosensitive element 16. The corrective action of the filter 12 is such that the camera is now ready to take pictures in daylight despite the fact that the container which carries the marker 4' accommodates a supply of color film intended for use in artificial light.

If the operator then decides to take pictures in artificial light, the plug 15 of the lighting unit 15A is simply inserted into the socket 14 to engage and to tilt the trip 7a from the position 7a' to the position 7a" so that the corrective filte 12 is moved out of registry with the aperture 13 and the grey filter 10 is moved out of registry with the photosensitive element 16 (see the phantom-line positions 10" and 12"). The exposure meter which includes the element 16 is now automatically calibrated to control the diaphragm in artificial light. In other words, the exposure meter is calibrated in a sense that its sensitivity changes in response to movement of the grey filter 10 from the position 10' to the position 10". This explains why the filter 10 actually constitutes an adjusting or calibrating device for the exposure meter.

The corrective filter 12 is assumed to be of the type which filters the light coming from a subject to such an extent that the reduction in the intensity of light which reaches the artificial-light color film (when the filter 12 assumes the position 12') is commensurate with the difference between the sensitivity of such artificial-light color film and the sensitivity of the film which is accommodated in the container 5.

In the camera of FIG. 1, the levers 2 and 7 can be coupled to each other by means of a pin-and-slot connection so that the distance between the lever 7 and the pivot 1 remains unchanged in all angular positions of the lever 2. The plug 15 of the lighting unit 15A can be replaced with a cam having an inclined cam face which is configurated in such a way that the trip 7a is only partly expelled from the socket 14, even at the time when the unit 15A already assumes its operative position with reference to the housing H. In such cameras, the distance between the photosensitive element 16 and the aperture 13 must be selected with a view to insure that, when the lever 7 assumes the third position 7", both the grey filter 10 and the corrective filter 12 assume their respective inoperative positions. Also, the camera may be adjusted for different speeds of the same film type in a manner known per se.

FIG. 2 illustrates a portion of a modified camera wherein a lever 107 which forms part of the detector comprises an extension 111 supporting a single one-piece filter 18 having a first section 18a which is analogous to the corrective filter 12. The section 18b is located in the path of the light rays which travel toward the photosensitive element 16 of the exposure meter when the lever 107 assumes a position corresponding to the solid-line position of the lever 7 shown in FIG. 1. When the lever 107 is shifted to the left, as viewed in FIG. 2, because the sensing element 3 enters the marker 4', the section 18b overlies the aperture 13 and the section 18a overlies the photosensitive element 16. In this embodiment of my invention, the photosensitive element 16 is located nearer to the aperture 13 than in FIG. 1.

Referring now to FIG. 3, there is shown a further camera which may be used with films of two different types and also with films of the same type but having different speeds. For example, the container 205 shown in FIG. 3 may accommodate a supply of daylight color film having a first speed and is provided with a second marker 19 in the form of a recess or notch having an end wall or stop shoulder 19'. A second container which accommodates daylight color film having a different speed will be formed with a marker or notch having an end wall 19a, a third container will have a marker or notch with an end wall 19b, etc. Of course, in addition to the marker 19, 19a or 19b, each container 205, etc. also comprises a first marker 4 or 4'. For example, the container 205 is assumed to have a first marker 4 which is tracked by the lever 2 (not shown in FIG. 3) in the same way as described in connection with FIG. 1. The camera of FIG. 3 comprises a speed compensating lever 21 which is reciprocably guided by a bearing 21a and carries a sensing element 20 extending into the right-hand marker 19 of the container 205 and abutting against the end wall 19' under the bias of a helical spring 22a. The upper end of the compensating lever 21 carries a wedge-like compensating filter 22 which is located in front of the photosensitive element 16. This wedge 22 is a grey filter having zones of different light transmissivity with gradual or stepwise transition between adjoining zones. Depending on the axial position of the compensating lever 21, a different zone of the wedge 22 is placed in front of the element 16 to thereby effect a secondary adjustment of the exposure meter which includes the element 16, a source 24 of electrical energy, and a moving coil instrument 23 of conventional design. The wedge 22 is provided in addition to the grey filter 10 on the lever 7. The mounting of the filters 10, 12 on the lever 7 is the same as described in connection with FIG. 1. The wedge 22 will remain in front of the photosensitive element 16 when the lever 7 is rocked to the position 7" (see FIG. 1).

It is clear that the sensitivity of the exposure meter 16, 23, 24 shown in FIG. 3 may be adjusted in a number of different ways so as to account for different speeds of the same type of film. Thus, the lever 21 and wedge 22 may be replaced by a speed compensating device which automatically scans the second markers 19, etc. and directly adjusts the initial position of the moving coil instrument 23. Also, such speed compensating device may assume the form of a regulator which adjusts a diaphragm located in the path of light rays which travel to the photosensitive element 16. Furthermore, the speed compensating device can comprise means for connecting or disconnecting resistors from the circuit of the exposure meter to thereby regulate the sensitivity of the exposure meter as a function of the speed of that film which is inserted into the camera housing. This last mentioned modification will be described in connection with FIG. 5.

Figure 4:
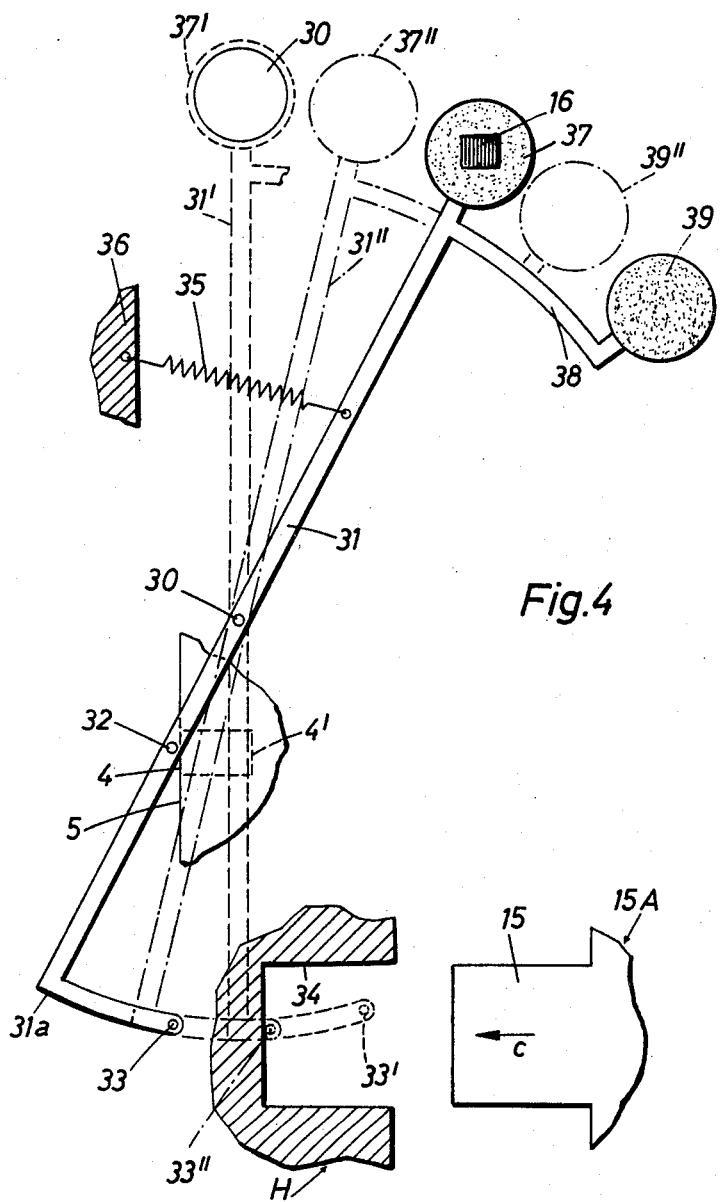
FIG. 4 is a diagrammatic partly sectional view of a fourth camera wherein the detector comprises a single lever.

FIG. 4 illustrates a motion picture camera or still camera wherein the detector comprises a single two-armed lever 31 which is rockable about the axis of a fixed pivot 30 secured to the housing H. The lower arm of the lever 31 carries a pin-shaped sensing element 32 which corresponds to the sensing element 3 of FIG. 1, and a motion transmitting portion or lower extension 31a having a pin-shaped tracking element 33. The sensing element 32 is shown in abutment with the flat marker 4 of a container 5 to maintain the lever 31 in a first position which is indicated by solid lines. When the sensing element 32 can enter the marker 4' of a different container which accommodates a second type of film, the lever 31 assumes a second position 31' which is indicated by broken lines. The motion transmitting portion 31a then moves the tracking element 33 to the position 33' in which this element extends into the interior of a socket 34 for the plug 15 of a lighting unit 15A. The socket 34 may be provided in a portion of the housing H. Another stationary portion 36 of the housing H is connected with one end of a spring 35 (corresponding to the spring 6 of FIG. 1) the other end of which is attached to the upper arm of the lever 31. The spring 35 serves to bias the sensing element 32 into engagement with the marker 4 or 4'.

The upper arm of the lever 31 carries a corrective filter 37 which corresponds to the filter 12 in FIG. 1, and a second corrective filter 39 which corresponds to the filter 10. The filter 39 is mounted on an upper extension 38 of the lever 31 and is distant from the photosensitive element 16 as well as form the aperture 13 when the lever 31 assumes the solid-line position. In the broken-line second position 31' of the lever 31, the filter 37 is located in the path of light rays which pass through the aperture 13, and the filter 39 is located in front of the photosensitive element 16. In other words, the filters 37 and 39 exchange positions insofar as the element 16 is concerned because, in the solid-line position of the lever 31, the filter 37 is located in front of the element 16. The second position of the filter 37 is indicated by broken lines, as at 37′.

The light transmissivity of the filter 37 is the same as that of the filter 39, and the distance between these filters is selected in such a way that the filter 37 (in the position 37′) overlies the aperture 13 when the filter 39 moves in front of the photosensitive element 16.

The lever 31 may assume its solid-line (first) position when the operator decides to insert into the housing H a container 5 which accommodates a supply of black-and-white film or a supply of equivalent daylight color film. The sensing element 32 then abuts against the flat marker 4 and the tracking element 33 on the motion transmitting portion 31a is withdrawn from the socket 34. The aperture 13 is unobstructed but the filter 37 is located in front of the photosensitive element 16 which forms part of an adjustable exposure meter. The lever 31 is permanently biased by the spring 35 so that the sensing element 32 remains in abutment with the marker 4.

If the operator withdraws the container 5 and replaces it with a container provided with the marker 4′ and accommodating a supply of artificial-light color film, the spring 35 compels the sensing element 32 to enter the marker 4′ so that the lever 31 assumes the second position 31′. The tracking element 33 on the motion transmitting portion 31a then moves to the broken-line position 31′ and extends well into the socket 34. The filter 37 is moved to the position 37′ and is located in the path of light rays which pass through the aperture 13, and the filter 39 is moved in front of the photosensitive element 16. The camera is now ready to take pictures in daylight despite the fact that the container which is inserted into the housing H accommodates a supply of artificial-light color film.

Should the operator decide to take pictures in artificial light, the plug 15 of the lighting unit 15A is inserted in the direction indicated by the arrow c. As it penetrates into the socket 34, the plug 15 rocks the tracking element 33 from the broken-line positions 33′ to the phantom-line position 33″ whereby the lever 31 assumes a third position 31″ which is indicated by phantom lines. This third position is located between the first two positions and is selected in such a way that the travel of light rays through the aperture 13 and also to the photosensitive element 16 is unobstructed because the filters 37, 39 respectively assume the phantom-line positions 37″, 39″. It will be noted that the filter 37 constitutes an adjusting or calibrating device for the exposure meter which includes the photosensitive element 16. The exposure meter is now calibrated for the sensitivity of that film which is accommodated in the cartridge having the marker 4′.

Figure 5:
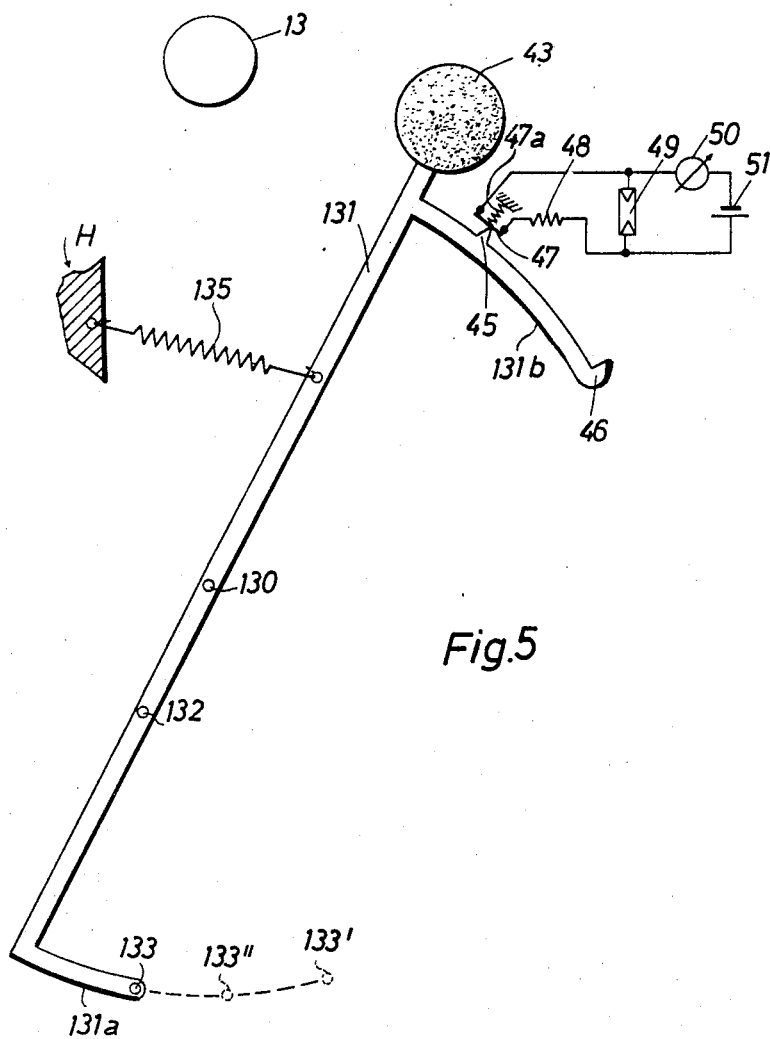
FIG. 5 illustrates a modification of the structure shown in FIG. 4.

Referring finally to FIG. 5, there is shown a portion of a still camera or motion picture camera wherein the detector again comprises a single (one-piece) two-armed lever 131 which is rockable about the axis of a fixed pivot 130 and includes a sensing element 132 corresponding to the element 32 of FIG. 4. The lower arm of the lever 131 carries a motion transmitting portion 131a having a tracking element 133 whose purpose is the same as that of the tracking element 33 shown in FIG. 4. This tracking element 133 may be moved to a second position 133′ or to a third or median position 133″.

The upper arm of the lever 131 carries a corrective filter 43 which corresponds to the filter 12 of FIG. 1, and an extension 131b which carries two adjusting or calibrating members 45, 46 in the form of teeth or trips 45, 46. When the lever 131 is moved to the second position (not shown), i.e., when the tracking element 133 moves to the position 133′, the filter 43 is located in front of the aperture 13, namely, in the path of light rays coming from the subject and travelling to the unexposed film frame in the container that is inserted into the housing H.

In the solid-line position of FIG. 5, the trip 45 closes a normally open switch 47 which is connected in the circuit of an adjustable exposure meter including a resistor 48, a photosensitive element 49, a source 51 of electrical energy, and a moving coil instrument 50. The resistor 48 is connected in parallel with the photosensitive element 49, and the switch 47 is connected in series with the resistor 48. In the second position of the lever 131 (i.e., when the filter 43 is located in front of the aperture 13, the switch 47 is closed by the trip 46. In the third position of the lever, 131, i.e., when the tracking element 133 assumes the median position 133″, the switch 47 remains open to thereby change the initial setting of the exposure meter.

The solid-line position of the lever 131 corresponds to that position when the sensing element 132 is biased by a spring 135 to abut against a flat marker 4 (not shown) provided on the external surface of a container which accommodates a supply of black-and-white film or a supply of daylight color film. If the container accommodates a supply of artificial-light color film (so that the tracking element 133 moves to the position 133′), the filter 43 is moved in front of the aperture 13 and the switch 47 is closed by the trip 46. In response to movement of the lighting unit (not shown) to its operative position, the tracking element 133 is moved from the position 133′ to the position 133″ and the filter 43 moves to a third position (not shown) which is somewhere between the solid-line position of FIG. 5 and the aperture 13. The trips 45, 46 are disengaged from the switch 47 so that the latter opens in response to the bias of a spring 47a and disconnects the resistor 48 from the circuit of the photosensitive element 49. The exposure meter is now adjusted by full consideration of the sensitivity of artificial-light color film which is accommodated in the container provided with a marker 4′.

It is clear that the camera of FIG. 5 may be modified in a number of ways without departing from the spirit of my invention. For example, the electric circuit of the exposure meter may comprise two normally open switches 47 which are connected in parallel, and the extension 131b of the detector lever 131 then carries a single trip 45 or 46 which closes one of the switches in the solid-line position and the other switch in the position 133′ of the tracking element 133. Furthermore, and as explained hereinbefore, the exposure meter may be adjusted for various sensitivities of the same type of film in a number of ways, such as by changing the initial position of the moving coil instrument 50.

Without further analysis, the foregoing will so fully reveal the gist of the present invention that others can, by applying current knowledge, readily adapt it for various applications without omitting features that fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a camera for use with different types of film which are furnished in containers provided with markers indicative of the film type therein, housing means; movable detector means mounted in said housing means and arranged to assume first and second positions in response to engagement with the markers of containers which respectively contain first and second film types; means for guiding incoming light rays along a predetermined path; filter means operatively connected with said detector means to extend into and to be removed from said path when said detector means respectively assumes said second and first positions; a lighting unit movable with reference to said housing means to and from an operative position in which said detector means is caused to assume a third position and to remove said filter means from said path; adjustable exposure meter means; and adjusting means operatively connected with said detector means for adjusting said exposure meter means only in the operative position of said lighting unit.

2. A structure as set forth in claim 1, wherein said detector means comprises a first lever comprising sensing means for scanning the marker of that container which is inserted into said housing means, a second lever articulately coupled to said first lever and having a portion extending into the path of said lighting unit so that, on movement of said lighting unit to operative position, said second lever is moved with reference to said first lever to a position representing the third position of said detector means.

3. In a camera for use with different types of film which are furnished in containers provided with markers indicative of the film type therein, housing means; movable detector means mounted in said housing means and arranged to assume first and second positions in response to engagement with the markers of containers which respectively contain first and second film types, said detector means comprising a first lever including sensing means for scanning the marker of that container which is inserted into said housing means; means for guiding incoming light rays along a predetermined path; filter means operatively connected with said detector means to extend into and to be removed from said path when said detector means respectively assumes said second and first positions; a lighting unit movable with reference to said housing means to and from an operative position in which said detector means is caused to assume a third position and to remove said filter means from said path, said detector means comprising a second lever articulately coupled to said first lever and having a portion extending into the path of said lighting unit so that, on movement of said lighting unit to operative position, said second lever is moved with reference to said first lever; to a position representing the third position of said detector means; guide means for guiding said second lever in a substantially straight path in response to movement of said first lever; adjustable exposure meter means; and adjusting means operatively connected with said detector means for adjusting said exposure meter means in the operative position of said lighting unit.

4. A structure as set forth in claim 2, wherein said filter means is secured to said second lever and wherein said exposure meter means comprises a photosensitive element, said adjusting means comprising second filter means secured to said second lever and located in front of said photosensitive element in the first and second positions of said detector means.

5. In a camera for the use with different types of film which are furnished in containers provided with markers indicative of the film type therein, housing means; movable detector means mounted in said housing means and arranged to assume first and second positions in response to engagement with the markers of containers which respectively contain first and second film types; means for guiding incoming light rays along a predetermined path; filter means operatively connected with said detector means to extend into and to be removed from said path when said detector means respectively assumes said second and first positions; a lighting unit movable with reference to said housing means to and from an operative position in which said detector means is caused to assume a third position and to remove said filter means from said path; adjustable exposure meter means; and adjusting means operatively connected with said detector means for adjusting said exposure meter means in the operative position of said lighting unit, said detector means comprising a single lever rockable about a fixed axis between said first, second and third positions, said lever comprising sensing means for tracking the marker of that container which is inserted into said housing means and a motion transmitting portion extending into the path of said lighting unit.

6. A structure as set forth in claim 5, further comprising second filter means secured to said lever and having the same light transmissivity as said first filter means, said expoure meter means comprising a photosensitive element located at such a distance from said predetermined path that one of said filter means is located in front of said photosensitive element in the first position of said lever, that said one filter means extends into said predetermined path and the other filter means is located in front of said photosensitive element in the second position of said lever, and that the light rays may pass along said prodetermined path and may also reach said photosensitive element without passing through said filter means in the third position of said lever.

7. A structure as set forth in claim 5, wherein said third position of the lever is between said first and second positions thereof.

8. A structure as set forth in claim 5, wherein said adjusting means comprises at least two adjusting members provided on said lever to respectively adjust said exposure meter means in the first and second positions of the lever.

9. A structure as set forth in claim 8, wherein said exposure meter means comprises an electric circuit including a photosensitive element, resistor means connected in parallel with said photosensitive element, and normally open switch means connected in series with said resistor means, said adjusting members being arranged to close said switch means in the first and second positions of said lever.

10. A structure as set forth in claim 1, wherein each of said containers comprises a second marker indicative of the speed of film which is stored in the respective container, and further comprising compensating means arranged to track the second marker of that container which is inserted into said housing means and to adjust said exposure meter means in dependency on the sensitivity of film in the inserted container.

11. A structure as set forth in claim 10, wherein said compensating means comprises second filter means having zones of different light-transmissivity each of which corresponds to a different film speed, said exposure meter means comprising a photosensitive element and said second filter mean besing movable in front of said photosensitive element.

12. In a camera for use with two different types of film which are furnished in containers provided with markers indicative of the film type therein; a housing; movable detector means mounted in said housing and arranged to assume first and second positions in response to engagement with the markers of containers which respectively contain first and second film types; means for guiding incoming light rays along a predetermined path and on to an unexposed frame of that type of film which is inserted into said housing; filter means operatively connected with said detector means to extend into and to be removed from said path when said detector means respectively assumes said second and first positions; a lighting unit movable with reference to said housing to and from an operative position in which said detector means is caused by the lighting unit to move from said second position to a third position and to remove said filter means from said path; adjustable exposure meter means built into said housing; and adjusting means operatively connected with said detector means for adjusting said exposure meter means only in the operative position of said lighting unit.

13. A structure as set forth in claim 12, wherein said detector means comprises a lever which is movable between said first, second and third positions and wherein said lever comprises a motion transmitting portion which extends into a socket provided in said housing and arranged to accommodate a portion of said lighting unit in the operative position thereof so that movement of said lever from the second to third position takes place in response to insertion of said portion of the lighting unit into said socket.

14. A structure as set forth in claim 12, wherein said exposure meter means comprises a photosensitive element and wherein said adjusting means comprises second filter means which is located in front of said photosensitive element at least in one of said first and second positions of the detector means and which allows for unobstructed travel of light rays to said photosensitive element in the third position of said detector means.

15. A structure as set forth in claim 12, wherein said filter means comprises two sections one of which extends into said predetermined path in the second position of said detector means and the other of which constitutes said adjusting means, said exposure meter means comprising a photosensitive element which is respectively located behind said one and said other section in the first and second positions of said detector means.

16. A structure as set forth in claim 12, wherein each of said containers further comprises a second marker indicative of the speed of that film which is accommodated in the respective container, and further comprising compensating means for effecting a second adjustment of said exposure meter means to account for different film speeds.

17. A structure as set forth in claim 12, further comprising means for biasing said detector means into engagement with the marker of that container which is inserted into said housing.

References Cited

UNITED STATES PATENTS

| 3,176,599 | 4/1965 | Anwyl. | |
|-----------|--------|--------|---|
| 3,194,136 | 7/1965 | Ort | 95—10 |
| 3,208,363 | 9/1965 | Easterly et al. | 352—72 |
| 3,312,158 | 4/1967 | MacMillin et al. | 352—78 |
| 3,314,344 | 4/1967 | Anwyl et al. | 352—72 |
| 3,318,215 | 5/1967 | Schiks | 95—11.5 |

NORTON ANSHER, *Primary Examiner.*

J. F. PETERS, JR., *Assistant Examiner.*

U.S. Cl. X.R.

352—72; 95—31